Figure 1:
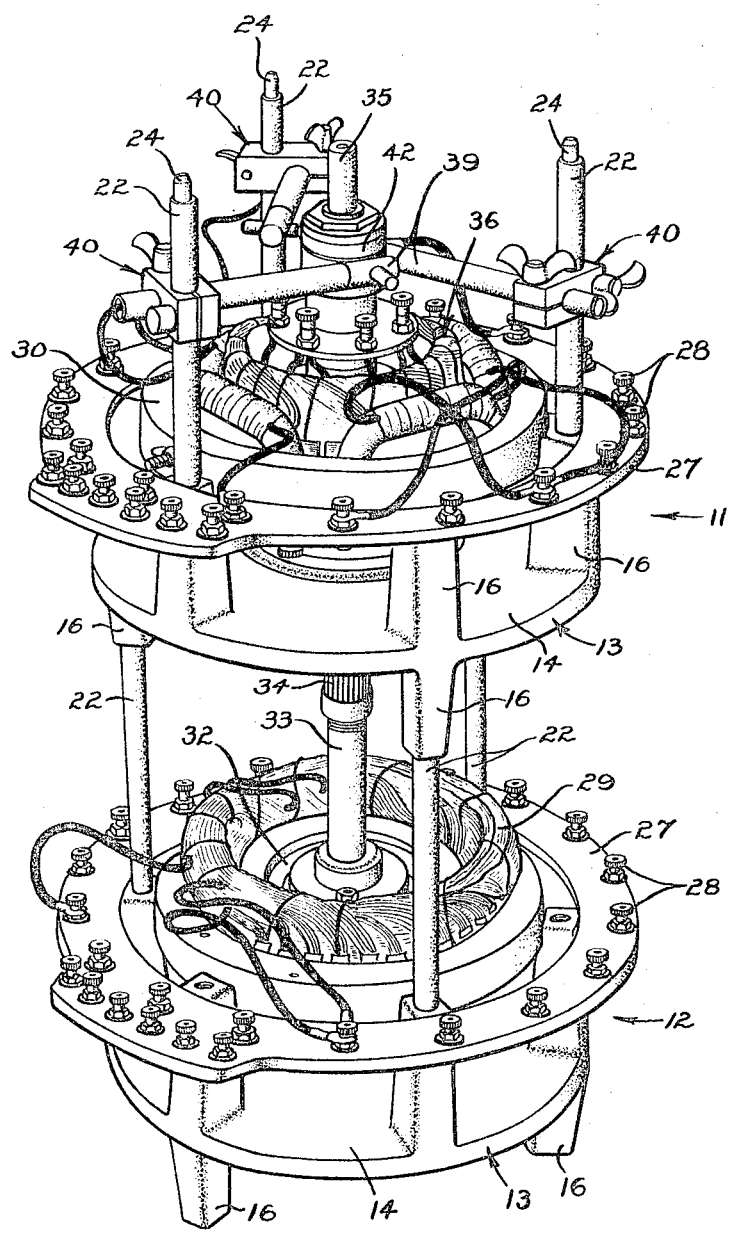

March 28, 1967 A. J. TUDOR 3,310,886
ELECTRICAL TEACHING AID
Filed April 13, 1965 2 Sheets-Sheet 1

INVENTOR.
ALLAN J. TUDOR
BY Oldham & Oldham
ATTYS.

United States Patent Office 3,310,886
Patented Mar. 28, 1967

3,310,886
ELECTRICAL TEACHING AID
Allan J. Tudor, 12 Ruthven Ave., Finchley Park,
South Australia, Australia
Filed Apr. 13, 1965, Ser. No. 447,814
Claims priority, application Australia, Apr. 15, 1964,
43,300/64
6 Claims. (Cl. 35—19)

This invention relates to a device which is useful as an electrical teaching aid for the teaching of magnetic effects, rotary machines with fixed magnetic fields, and rotary machines with rotating magnetic fields.

Teaching aids for electrical trade students are utilized for the illustration of current flow, Ohm's law, heating effect of current flow, production of magnetic field, generator and motor effect of a loop in a magnetic field, and other basic principles. However, it is difficult to illustrate how these principles are applied and the presentation of the application to students, for example for example to rotary machines, is always conducted theoretically. The use of illustrations is insufficient in many cases to impart the required knowledge to students of the principles of rotating fields and the like, and if reference is made to a full scale commercial machine this may tend to confuse rather than clarify. There is therefore a large gap between the principle illustrated and the principle applied commercially. It is therefore the main object of this invention to provide a teaching aid which will bridge this gap, and which will be relatively small and so constructed that every detail of this operation will be open to examination.

According to one form the invention may consist of an electrical teaching aid which comprises a pedestal having a plurality of circumferentially spaced columns projecting upwardly therefrom, the pedestal having a central boss containing a bearing, and a series of interchangeable rotors selectively positionable in the pedestal and rotationally supported in the bearing, pedestal also having a stator positioning means so that at least one stator can be located therein but removed readily therefrom. It is of course desirable to have a plurality of stators to illustrate different functions of a rotary machine.

It will be seen that the invention makes possible the teaching of the principle of motors, generators, meters and the like utilizing both a stationary and rotating field, it will be possible to show how reversal of direction can be achieved, it will be possible to illustrate the multiple roles of certain standard units, for example D.C. armatures, it is also possible to illustrate the principle of the salient pole stator in D.C. and A.C. machines, and further it will be seen that it becomes possible to utilize a series of devices arranged in tiers so as to show motor-generator exciter sets, frequency changers and the like. This gives students the opportunity to grasp the functional relationship of a large number of apparently unrelated devices.

Figure 2:
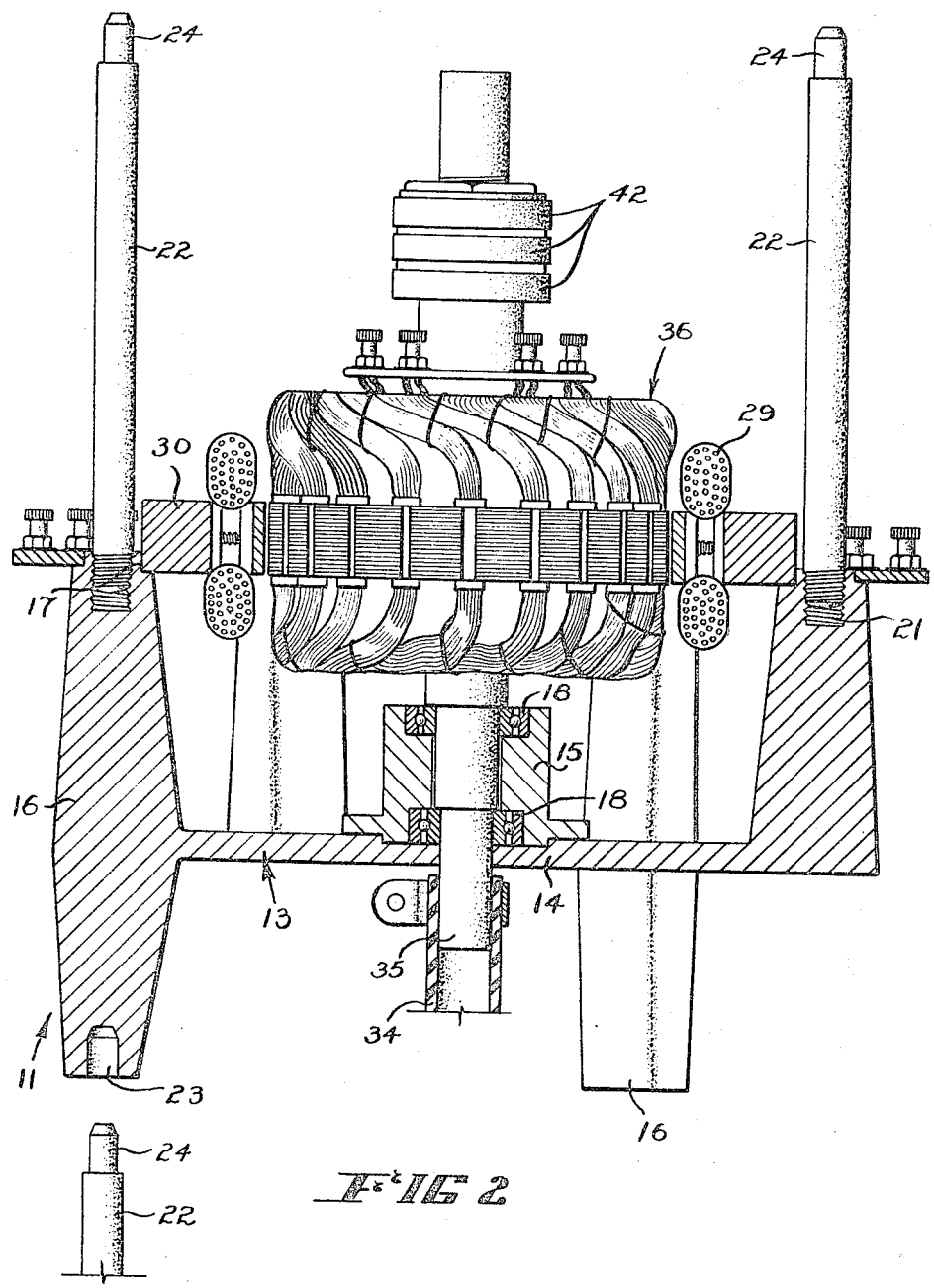

An embodiment of the invention is described hereunder in some detail with reference to and is illustrated in the accompanying drawings, in which:

FIG. 1 shows two devices assembled together one above the other so as to illustrate a motor-generator set, and FIG. 2 is a fragmentary section showing the upper part of FIG. 1.

FIG. 1 illustrates a pair of devices designated 11 and 12 which are mounted in tiers, each device consisting of a pedestal 13 which comprises a disc of aluminum 14 having thereon a central boss 15 and six aluminum columns 16 concentric with the boss 15 and equally spaced circumferentially around it. The inner surfaces of the columns 16 are machined at 17 concentrically with a pair of spaced ball races 18 constituting bearings in the boss 15. The upper and lower ends of the columns 16 are flat and are at right angles to the axis of the pedestal. The upper surfaces of the columns 16 contain threaded holes 21 to receive extension rods 22 their lower ends of which are threaded, and the under surfaces have dowel holes 23 to receive the plain ends 24 of such rods.

A series of teaching aids is associated with each of the devices, and in the embodiment shown in FIGS. 1 and 2 the teaching aids consist of terminal rings 27 which carry on their terminals 28 to which are connected the winding ends of stator windings 29, the stator windings 29 being disposed in a lamination stack 30 which is engaged and located by the machined surface 17 of the columns 16.

FIG. 1 illustrates a lower squirrel cage rotor 32, although of course it is the very essence of this invention but any one of a number of rotor types may be used, and the rotor shaft 33 is coupled with a flexible coupling 34 to the shaft 35 of an upper rotor 36 which is in this embodiment driven by the lower rotor 32. The rotor shaft in each case is axially confined by the ball races 18 as well as being journalled thereby.

The extension rods 22 serve varying purposes, and as shown in the drawings, may be used to retain the two pedestals 13 in their spaced relationship. They are also used for supporting the brush holder members 39 which are clamped with the clamps 40 to the extension rods 22. The brushes 41 in the brush holder members 39 engrave the slip rings 42.

The above embodiment has been described with reference to one of many rotary machine arrangements which can be illustrated by this invention. It will be seen however that the invention may also be used, for example, by positioning a sheet of non-magnetic material between the windings and dusted with magnetizable material such as iron filings, and a current passed through the coils around the poles will indicate the shape and intensity of magnetic flux.

The step landings on the columns can receive stator laminations of various configurations, thereby providing means to illustrate the varying conditions which are encountered with different types of windings.

It will be seen that by utilizing the bearings of the type described in the above embodiment, an armature can simply be positioned in the bearings from above and fully supported thereby as a centilever from the bearings, being constrained against axial displacement as well as being journalled in the bearings. It will also be seen a stack of devices can be built one above the other by simply interconnecting them as illustrated in FIG. 1 and described with reference thereto.

While one complete embodiment of the invention has been disclosed herein, it will be appreciated that modification of this particular embodiment of the invention may be resorted to without departing from the scope of the invention as defined in the appended claims.

What I claim is:

1. An electrical teaching aid comprising:
   a pedestal,
   a plurality of circumferentially spaced columns around the periphery of the pedestal and upstanding therefrom,
   a central boss in the pedestal,
   a bearing in the boss,
   a series of interchangeable rotors,
   a shaft in each rotor of size to be rotationally journalled in said bearing whereby the rotors are selectively positionable in said pedestal,
   stator positioning means on said pedestal, and at least one stator removably engageable on the pedestal and located by the stator positioning means concentric with said rotor when journalled in said bearing.

2. An electrical teaching aid comprising:
a pedestal,
a plurality of circumferentially spaced columns around the periphery of the pedestal and upstanding therefrom,
a further plurality of circumferentially spaced columns around the periphery and extending downwardly therefrom,
a series of extension rods extending upwardly from the upstanding columns, said extension rods being engageable in depending columns of a similar pedestal,
a central boss in the pedestal,
a bearing in the boss,
a series of interchangeable rotors,
a shaft in each rotor of size to be rotationally journalled in said bearing whereby the rotors are selectively positionable in said pedestal,
stator positioning means on said pedestal, and
at least one stator removably engageable on the pedestal and located by the stator positioning means concentric with a said rotor when journalled in said bearing.

3. An electrical teaching aid comprising:
a pedestal,
a plurality of circumferentially spaced columns around the periphery of the pedestal and upstanding therefrom, each column having a stepped landing,
a central boss in the pedestal,
a bearing in the boss,
a series of interchangeable rotors,
a shaft in each rotor of size to be rotationally journalled in said bearing whereby the rotors are selectively positionable in said pedestal, and
a series of interchangeable stator lamination stacks each removably engageable on a said stepped landing to be concentric with a said rotor when journalled in said bearing.

4. An electrical teaching aid comprising:
a plurality of pedestals,
a plurality of circumferentially spaced columns around the periphery of the pedestal and upstanding therefrom, each upstanding column having an aperture therein parallel to said central axis, the columns having stepped landings machined on their inner upper surfaces constituting stator positioning means,
a further plurality of circumferentially spaced columns around the periphery of the pedestal and depending therefrom, the lower surfaces thereof containing dowel holes,
a series of intermediate extension rods extending parallel to said central axis of the pedestals retaining the pedestals in a spaced aligned relationship, the lower end of each extension rod engaging a said aperture and the upper end located in a said dowel hole,
a central boss in each pedestal, each central boss containing a pair of spaced aligned ball races,
a series of interchangeable rotors each having a shaft of diameter to be rotationally supported by said ball races and retained thereby against axial movement, and
a series of interchangeable stator lamination stacks each removably engageable on a said stepped landing.

5. An electrical teaching aid comprising:
a plurality of pedestals,
a plurality of circumferentially spaced columns around the periphery of the pedestal and upstanding therefrom, each upstanding column having a threaded aperture therein parallel to said central axis, the columns having stepped landings machined on their inner upper surfaces constituting stator positioning means,
a further plurality of circumferentially spaced columns around the periphery of the pedestal and depending therefrom, the lower surfaces thereof containing dowel holes,
a series of intermediate extension rods extending parallel to said central axis of the pedestals retaining the pedestals in a spaced aligned relationship, the lower end of each extension rod threadably engaging a said threaded aperture and the upper end located in a said dowel hole,
a series of upper extension rods also extending parallel to said central axis of the pedestals, the lower end of each said upper extension rod threadably engaging a said threaded aperture in the uppermost of said pedestals,
a series of brush holder members clamped each to a said extension rod and each containing a brush,
a central boss in each pedestal, each central boss containing a pair of spaced aligned ball races,
a series of interchangeable rotors each having a shaft of diameter to be rotationally supported by said ball races and retained thereby against axial movement, and
a series of interchangeable stator lamination stacks each removably engageable on a said stepped landing.

6. An electrical teaching aid comprising:
a plurality of pedestals,
a plurality of circumferentially spaced columns around the periphery of the pedestal and upstanding therefrom, the upper surfaces of the columns being co-planar and disposed at right angles to the central axis of the pedestal, each upstanding column having a threaded aperture therein parallel to said central axis, the columns having stepped landings machined on their inner upper surfaces constituting stator positioning means,
a further plurality of circumferentially spaced columns around the periphery of the pedestal and depending therefrom, the lower surfaces thereof being co-planar and disposed at right angles to said central axis and containing dowel holes,
a series of intermediate extension rods extending parallel to said central axis of the pedestals retaining the pedestals in a spaced aligned relationship, the lower end of each extension rod threadably engaging a said threaded aperture and the upper end located in a said dowel hole,
a series of upper extension rods also extending parallel to said central axis of the pedestals, the lower end of each said upper extension rod threadably engaging a said threaded aperture in the uppermost of said pedestals,
a series of brush holder members clamped each to a said extension rod and each containing a brush,
a terminal ring supporting a series of terminals surrounding each pedestal,
a central boss in each pedestal, each central boss containing a pair of spaced aligned ball races,
a series of interchangeable rotors each having a shaft of diameter to be rotationally supported by said ball races and retained thereby against axial movement, and
a series of interchangeable stator lamination stacks each removably engageable on a said stepped landing.

References Cited by the Examiner
UNITED STATES PATENTS

| | | | |
|---|---|---|---|
| 2,949,680 | 8/1960 | Black | 35—19 |
| 3,080,663 | 3/1963 | Black | 35—19 |

EUGENE R. CAPOZIO, *Primary Examiner.*

H. S. SKOGQUIST, *Assistant Examiner.*